United States Patent [19]

Brodsky et al.

[11] Patent Number: 4,920,476
[45] Date of Patent: Apr. 24, 1990

[54] ELECTRONIC CONTROL FOR LIGHTING PANELBOARDS

[75] Inventors: Bruce L. Brodsky, South Fayette Twp., Allegheny County; David L. Davidson, New Alexandria; Dwight L. Hutton, Monroeville; William L. Vasiladiotis, Bell Acres; Mark D. White, South Park Twp., Allegheny County, all of Pa.

[73] Assignee: Westinghouse Electric Corp., Pittsburgh, Pa.

[21] Appl. No.: 199,488

[22] Filed: May 27, 1988

[51] Int. Cl.$^5$ .............................................. H02H 3/08
[52] U.S. Cl. ..................................... 364/140; 361/96; 364/483
[58] Field of Search ............... 364/483, 140, 481, 492; 361/96, 83, 93, 94, 95

[56] References Cited

U.S. PATENT DOCUMENTS

| | | | |
|---|---|---|---|
| 4,636,935 | 1/1987 | Tschernenko | 364/140 |
| 4,694,373 | 9/1987 | Demey | 364/483 |
| 4,710,845 | 12/1987 | Denmyer | 364/483 |
| 4,717,985 | 1/1988 | Demeyer | 364/483 |
| 4,722,059 | 1/1988 | Fingel | 364/483 |

Primary Examiner—Michael R. Fleming
Attorney, Agent, or Firm—M. J. Moran

[57] ABSTRACT

An electronically controlled lighting panelboard characterized by a power line panelboard having a plurality of remotely controlled circuit breakers for opening and closing circuits to corresponding loads. Each circuit breaker is interconnected to an interface which in turn is connected by a multi-conductor cable to an electronic controller or computer.

7 Claims, 3 Drawing Sheets

ELECTRONIC CONTROL FOR LIGHTING PANELBOARDS

CROSS REFERENCE TO RELATED APPLICATIONS

The invention disclosed herein relates to communication and control systems. The following commonly assigned U.S. patent applications relate to such communication and control systems: Ser. No. 625,747, filed on June 28, 1984 by William R. Verbanets and entitled "Multipurpose Digital IC for Communication and Control Network" (W.E. Case No. 51,930); Ser. No. 625,863, filed on June 28, 1984 by William R. Verbanets and Theodore H. York and entitled "Improved Digital IC-Microcomputer Interface (W.E. Case No. 51,931); U.S. Pat. No. 4,653,072 issued Mar. 24, 1987 to Leonard C. Vercellotti and William R. Verbanets and entitled "Low Error Rate Digital Demodulator; U.S. Pat. No. 4,644,547 issued on Feb. 17, 1987 to Leonard C. Vercellotti, William R. Verbanets and Theodore H. York entitled "Digital Message Format for Two-Way Communication and Control Network"; Ser. No. 769,640, filed Aug. 26, 1985 by John C. Schlotterer entitled "Communication and Control Network Master Interface for Personal Computer" (W.E. Case No. 52,212); Ser. No. 769,642, filed Aug. 26, 1985, by Bruce L. Brodsky entitled "Computer Driver Module for Master Interface to Communication and Control Network" (W.E. Case 52,214); U.S. Pat. No. 4,646,319 issued on Feb. 24, 1987 to Joseph C. Engel, Leonard C. Vercellotti, and David L. Boomgaard, entitled "Biodirectional Bus Coupler Presenting Peak Impedance at Carrier Frequency"; and Ser. No. 199,417, filed on May 27, 1988, by Bruce T. Brodsky and D. L. Davidson, entitled "Electronic Control of Solenoid Operated Circuit Breaker" (W.E. 53,996).

BACKGROUND OF THE INVENTION

1. Technical Field

This invention relates to communication and control systems and, more particularly, it pertains to electronic control of lighting panelboards.

2. Description of the Prior Art

Current technology for controlling lighting loads remotely requires the use of an interposed relay. The relay is located between the circuit breaker and the load. This technology has several disadvantages including (1) hardware relay assembly requiring a relay to be remote from a panelboard due to space limitations, (2) higher labor costs from increased wiring, (3) reliability problems due to additional functional parts such as a relay; and (4) minimal diagnostic capabilities from a controller such as determination of the status of the circuit breakers.

An object of this invention is to provide for individual control of many circuit breakers in a panelboard through an electronic control such as a computer.

DISCLOSURE OF THE INVENTION

In accordance with this invention, there is provided an integrated building electrical load management system comprising a panelboard having a plurality of circuit breakers for controlling each load, a printed circuit board having a plurality of conductor connections and of breaker connections, electronic control means for providing electronic control and diagnostics for the circuit board and having a plurality of conductors leading to the conductor connections, the panelboard and printed circuit board being contained within an enclosure and the circuit breakers being individually connected to the circuit board, and each circuit breaker including a remotely controlled solenoid for actuating the circuit breaker for opening and closing a circuit through a load and which solenoid includes control wires connected to the breaker connection, whereby the printed circuit board functions as a circuit breaker interface between the separate circuit breakers and the electronic control means.

DESCRIPTION OF THE PREFERRED EMBODIMENTS

Figure 1:
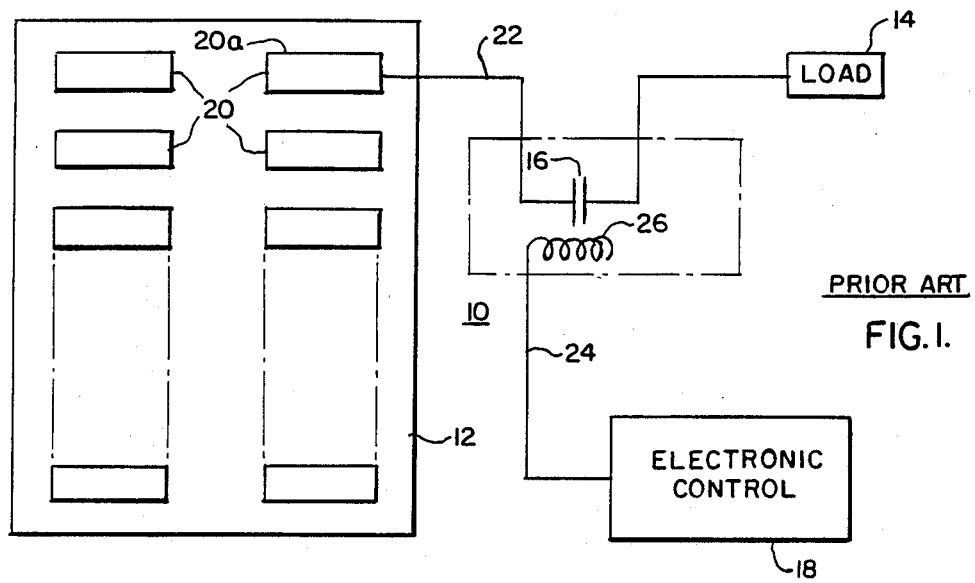
FIG. 1 is a block diagram of the hardware components of a prior art structure.

A prior art structure for an electronic control of a panelboard is generally indicated at 10 in FIG. 1, and it comprises a panelboard 12, a load 14, a relay 16, and an electronic control 18. The panelboard 12 includes a plurality of circuit breakers 20, each of which is connected electrically to a separate load. For example, the particular circuit breaker 20a is connected by a conductor 22 to the load 14 and the other circuit breakers 20 are separately connected to other loads not shown.

Each conductor 22 comprised a hardwire relay assembly including the relay 16 to provide control of the load by means of the electronic control 18, such as a computer, which is connected by a conductor 24 to a relay coil 26 for actuating the relay 16. This prior art structure had the disadvantage of requiring the relay to be remote from the panelboard due to space limitations on the panelboard.

In accordance with this invention, there is provided a panelboard 28 (FIG. 2) and an electronic control such as a computer 30. The panelboard 28 is contained within a box or enclosure 32 having opposite sidewalls 34 and end walls 36. The panelboard 28 comprises a plurality of circuit breakers 38 each of which is connected to a line bus bar 40. Each circuit breaker 38 is also connected to a separate load 42.

Figure 2:
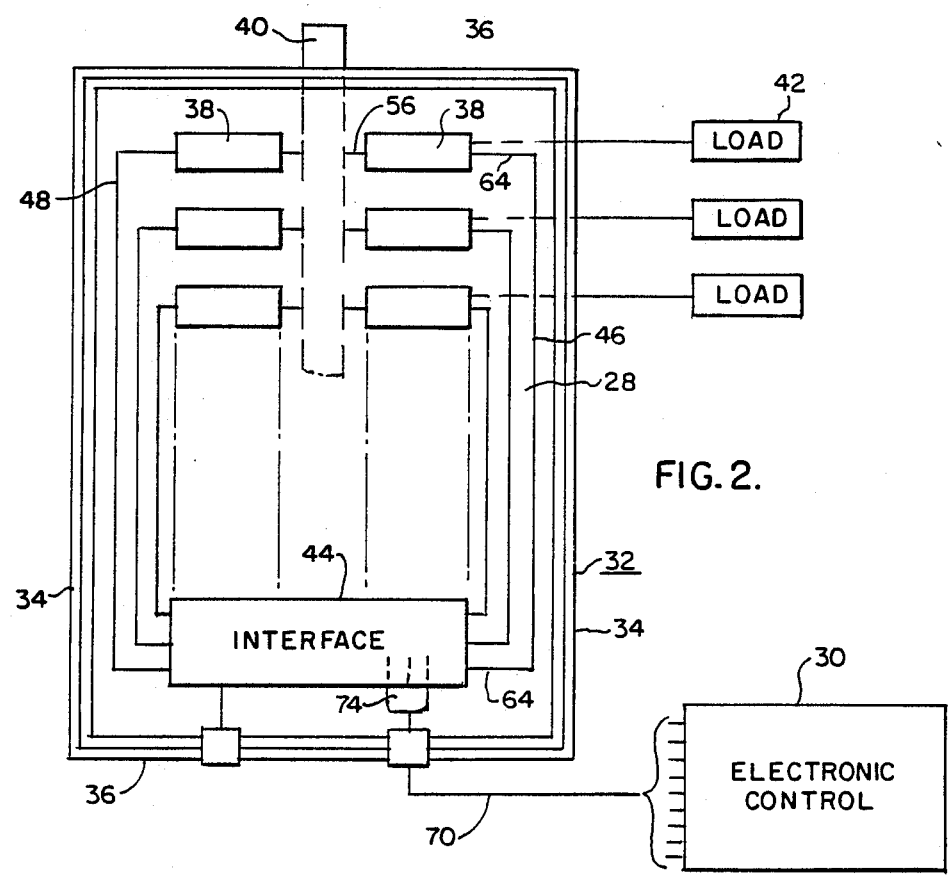
FIG. 2 is a schematic view of the hardware interface between the circuit breakers on a panelboard and the electronic control in accordance with this invention.
Figure 4:
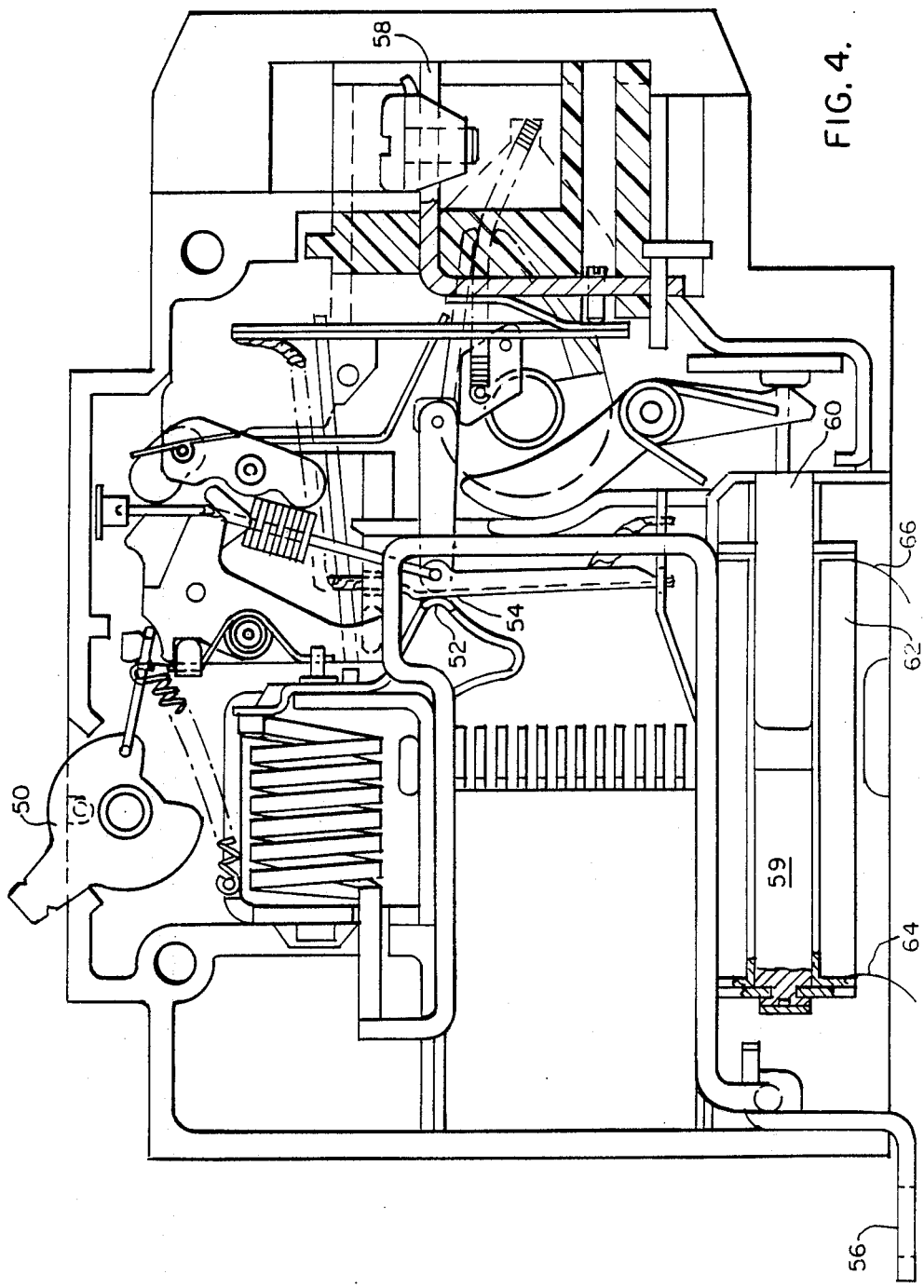
FIG. 4 is a sectional view through a remotely controlled solenoid operated circuit breaker.

For the purpose of this invention, the several circuit breakers 38 are solenoid operated breakers which are interconnected with an interface or printed circuit board 44 by means of conductors 46, 48. However, standard circuit breakers which are not solenoid operated may also be mounted on the panelboard where control by the electronic control 30 is not necessary. A typical solenoid operated circuit breaker 38 is that shown in Pat. No. 4,654,614, which is shown in FIG. 4. It comprises a manually operated handle 50 for opening and closing contacts 52, 54 which are disposed between line and load terminals 56, 58. A solenoid 59 has a plunger 60 for operating on mechanisms within the circuit breaker in a well-known manner for opening and closing the contacts 52, 54 by remote control by a coil 62 having the conductor leads 64 (FIGS. 2, 4). Accordingly, a circuit to the load 42 may be open or closed remotely by the solenoid plunger 60 in response to operation of the electronic control 30 acting through the interface 44.

Figure 3:
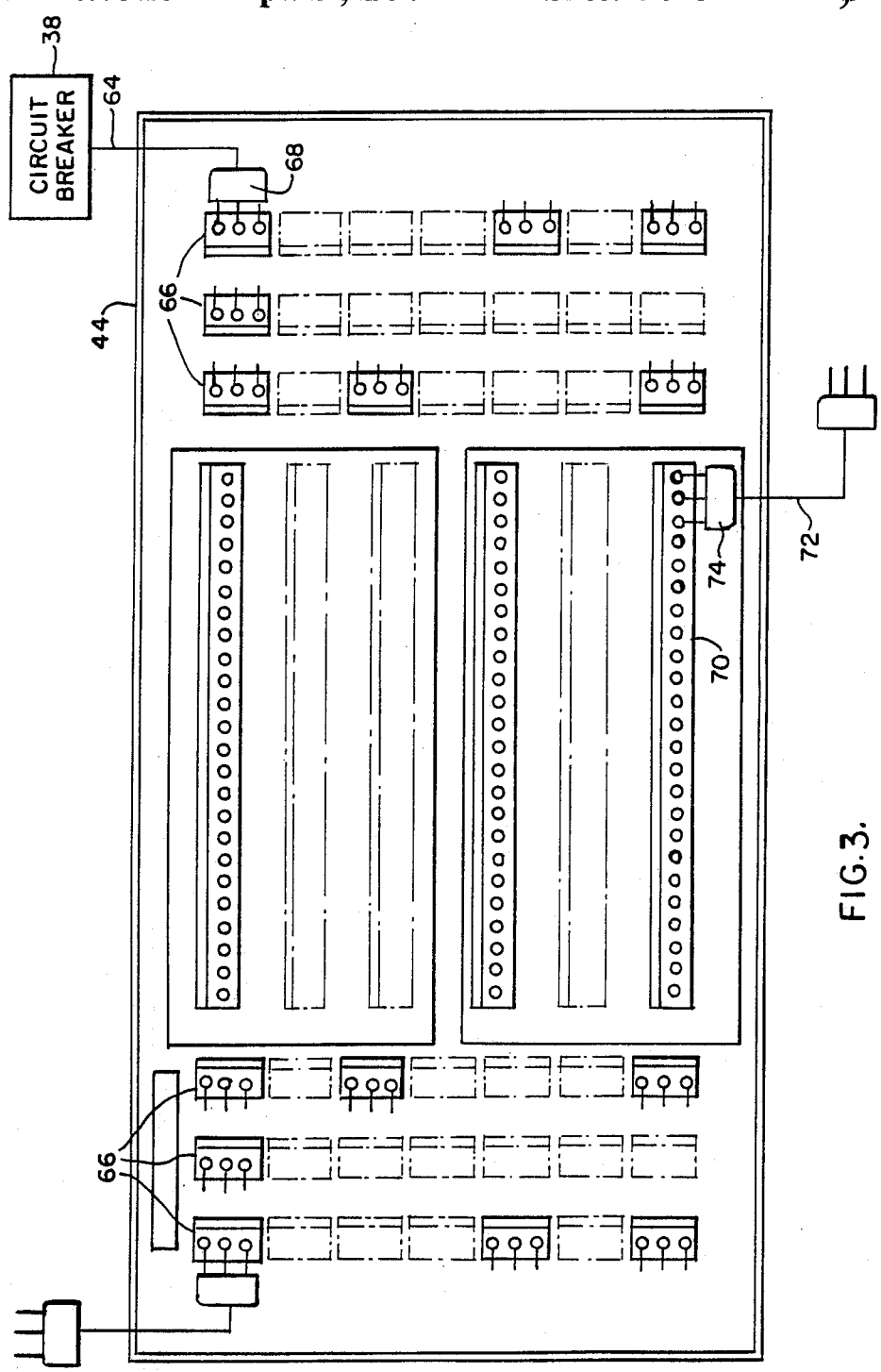
FIG. 3 is a schematic view of the panelboard showing breaker connections and output cable connections.

The interface 44 (FIG. 3) is a printed circuit board and card and is a modular, compact interface surface for the control circuitry wiring. It comprises a plurality of circuit breaker connections 66, one for each solenoid circuit breaker 38. The interface or circuit board 44 provides interface capability for up to forty-two circuit breakers. The interface is provided by simple plug-in connectors 68 on the conductor lead 64. The interface 44 or circuit board is mounted on or adjacent to the panelboard 28 (FIG. 2). Any number and combination of interface points up to the maximum can be used in each board.

In addition to the circuit breaker connectors 66, output cable connections 70 are provided by which the electronic control 30 is connected to the interface through a cable harness 72. For clarity, interconnections between the several circuit breaker connections 66 and corresponding output cable connectors are not shown. Each cable harness 72 includes a plug-in connector 74. The cable harness 72 comprises control wiring for a plurality of circuit breakers 38 connection between each of the several circuit breakers to the circuit breaker connectors 66 or through the plug-in connectors 68 having three pin plug-in connectors. The cable harness 72 having the plug-in connector 74 likewise comprises a three pin plug-in connection with the output cable connector 70. The electronic control or computer 30 provides control and diagnostics for the several circuit breakers 38.

In summary, the system of this device provides a true and accurate monitoring of the position of the circuit breaker whether open or closed, and an alarm for an unexpected change. It is capable of not only sending messages from the electronic control to the circuit breaker, but also in a reverse direction so as to provide a report-back function. In addition, a loss of control power does not result in loss of breakers and the relay function and the breaker functions are in one box, resulting in lower installation costs. Finally, the panelboard is independent of the controller in that the panelboard can be interfaced with any controller via the appropriate pin connector.

We claim:

1. In an integrated building electrical load management system, the combination of, a power line panelboard having a plurality of circuit breakers for controlling electrical loads;
   printed circuit board means having a plurality of conductor connections and of breaker connections;
   electronic control means for providing electronic control and diagnostics for the circuit board means and having a plurality of conductors leading to the conductor connections; and
   each circuit breaker including a remotely controlled solenoid for mechanically actuating the circuit breaker for opening and closing a circuit through a load and which solenoid includes control wires connected to selected breaker connections, said circuit breaker as thusly configured operating as a controlled switch in addition to providing a circuit protective function;
   whereby the printed circuit board means functions as a circuit breaker interface between the separate circuit breakers and the electronic control means.

2. The combination of claim 1 in which the panelboard and printed circuit board means are contained within an enclosure and the circuit breakers being individually connected to the printed circuit board means.

3. The combination of claim 2 in which each circuit breaker controls one load.

4. The combination of claim 3 in which the conductor connections are electrically interconnected to corresponding breaker connections.

5. The combination of claim 4 in which the plurality of conductors of the electronic control means extend through the enclosure.

6. The combination of claim 5 in which operation of the circuit breaker reports back to the electronic control means for providing said electronic control means with a status indication of said circuit breaker.

7. The combination of claim 6 in which the electronic control means comprises a computer.

* * * * *